US009003407B2

(12) United States Patent
Bozek et al.

(10) Patent No.: US 9,003,407 B2
(45) Date of Patent: Apr. 7, 2015

(54) DYNAMICALLY PROVISIONING VIRTUAL MACHINES

(75) Inventors: James J. Bozek, Bothell, WA (US); Bruce A. Smith, Austin, TX (US); Edward S. Suffern, Chapel Hill, NC (US); James L. Wooldridge, Fall City, WA (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 13/607,289

(22) Filed: Sep. 7, 2012

(65) Prior Publication Data

US 2012/0331468 A1 Dec. 27, 2012

Related U.S. Application Data

(62) Division of application No. 12/630,607, filed on Dec. 3, 2009, now Pat. No. 8,352,953.

(51) Int. Cl.
*G06F 9/455* (2006.01)
*H04L 12/24* (2006.01)
*H04L 12/26* (2006.01)
*G06F 9/50* (2006.01)

(52) U.S. Cl.
CPC ........ *H04L 41/0896* (2013.01); *H04L 41/0806* (2013.01); *H04L 43/0882* (2013.01); *G06F 9/5088* (2013.01)

(58) Field of Classification Search
None
See application file for complete search history.

(56) References Cited

U.S. PATENT DOCUMENTS

| 7,127,716 | B2 | 10/2006 | Jin et al. |
| 7,162,711 | B2 | 1/2007 | Czajkowski et al. |
| 7,165,108 | B2 | 1/2007 | Matena et al. |
| 7,197,489 | B1 * | 3/2007 | Gauvin et al. ............ 1/1 |
| 7,213,065 | B2 | 5/2007 | Watt |
| 7,257,811 | B2 | 8/2007 | Hunt et al. |
| 7,395,388 | B2 | 7/2008 | Suigiura et al. |
| 7,437,730 | B2 | 10/2008 | Goyal |
| 7,716,377 | B2 | 5/2010 | Harris et al. |
| 7,970,903 | B2 * | 6/2011 | Oeda .............................. 709/226 |
| 2003/0217166 | A1 | 11/2003 | Dal Canto et al. |
| 2005/0198303 | A1 * | 9/2005 | Knauerhase et al. ......... 709/227 |

(Continued)

FOREIGN PATENT DOCUMENTS

| JP | 3065734 A | 3/1991 |
| JP | 4355836 A | 12/1992 |

OTHER PUBLICATIONS

Zhao-et al.; "Experimental Study of Virtual Machine Migration in Support of Reservation of Cluster Resources"; ACM Digital Library; pp. 1-8; 2007.

(Continued)

*Primary Examiner* — Gregory A Kessler
(74) *Attorney, Agent, or Firm* — Mark McBurney; Jeffrey L. Streets (57) ABSTRACT

Virtual machines are managed on the basis of data obtained from a management information database of a network switch having a plurality of Ethernet links coupled to compute nodes running a plurality of virtual machines. A management entity, such as a provisioning manager, determines the amount of network bandwidth being utilized through each of the Ethernet links. Accordingly, an additional virtual machine may be provisioned to the compute node that is coupled to an Ethernet link identified as having the greatest amount of unutilized network bandwidth.

10 Claims, 5 Drawing Sheets

(56) References Cited

U.S. PATENT DOCUMENTS

| | | | |
|---|---|---|---|
| 2006/0025985 A1* | 2/2006 | Vinberg et al. | 703/22 |
| 2007/0130566 A1 | 6/2007 | van Rietschote et al. | |
| 2007/0288921 A1 | 12/2007 | King et al. | |
| 2008/0091761 A1 | 4/2008 | Tsao | |
| 2008/0196043 A1 | 8/2008 | Feinleib et al. | |
| 2008/0307183 A1 | 12/2008 | DeVal et al. | |
| 2009/0106409 A1 | 4/2009 | Murata | |
| 2009/0150529 A1 | 6/2009 | Tripathi | |
| 2009/0228589 A1 | 9/2009 | Korupolu | |
| 2010/0138829 A1 | 6/2010 | Hanquez et al. | |

OTHER PUBLICATIONS

Urgaonkar-et al.; "Agile Dynamic Provisioning of Multi-Tier Internet Applications"; ACM Digital Library; pp. 1-39; 2008.

Shivam-et al.; "Automated an On-Demand Provisioning of Virtual Machines for Database Applications"; ACM Digital Library; pp. 1079-1081; 2007.

IBM-"Automatic Virtual Machine Provisioning"; IPCOM000128928D; 4 pages, Sep. 21, 2005.

Sundararaj-et al.; "Automatic, run-time and dynamic adaptation of distributed applications executing in virtual environments"; Dialog-Dissertation Absts., V67-10B; 2006.

Gulati et al., "RePAIR: Reservation-Based Proportionate Allocation For IO Resources", pp. 1-19.

Wood et al., "Black-box and Gray-box Strategies for Virtual Machine Migration", University of Massachusetts Amherst, Department of Computer Science, http://www.google.com/url?sa=t&source=web&ct=res&cd=4&url=http://www.cs.umass.edu/~twood/pubs/nsdi07.ppt&ei=wJdwSuTeHY3GMMvR8Nsl&rct=j&q=virtual%20machine%20migration%20response%20time&usg=AFQjCNHe7NXbO3KoB-aCQ1C__ZG9jlHkRYg, pp. 1-27.

Altor Networks, "5 Best Practices to Protect Your Virtual Environment", Altor Networkds White Paper: 5 Best Practices To Protect Your Virtual Environment, 2009-2010, pp. 1-5.

Jian Wang, "Survey of State-of-the-art in Inter-VM Communication Mechanisms", Sep. 27, 2009, pp. 1-25.

Anton Burtsev et al., "Fido: Fast Inter-Virtual-Machine Communication for Enterprise Appliances", 2009-2010, 1-37 slides (pages).

Chang-et al.; "Virtual machine support for zero-loss Internet service recovery"; INSPEC/Software: Practice & Experience, vol. 37, No. 13, pp. 1349-1376; Nov. 2007.

QLogic, "QLogic 10GbE Intelligent Networking Boosts Virtual Mahcine Performance", White paper, pp. 1-4.

Cisco, "Cisco Nexus 1000V Network Analysis Module Virtual Service Blade", Data Sheet, 2010, pp. 1-7.

* cited by examiner

DYNAMICALLY PROVISIONING VIRTUAL MACHINES

CROSS-REFERENCE TO RELATED APPLICATIONS

This application is a divisional of co-pending U.S. patent application Ser. No. 12/630,607, filed on Dec. 3, 2009.

BACKGROUND

1. Field of the Invention

The present invention relates to the management of virtual machines. More specifically, the present invention relates to management of the network bandwidth in a virtual machine environment.

2. Background of the Related Art

In a cloud computing environment, a user is assigned a virtual machine somewhere in the computing cloud. The virtual machine provides the software operating system and physical resources, such as processing power and memory, to support the user's application. Provisioning software assigns virtual machines based on the amount of storage required to store the application and the amount of storage to execute the applications.

Figure 1:
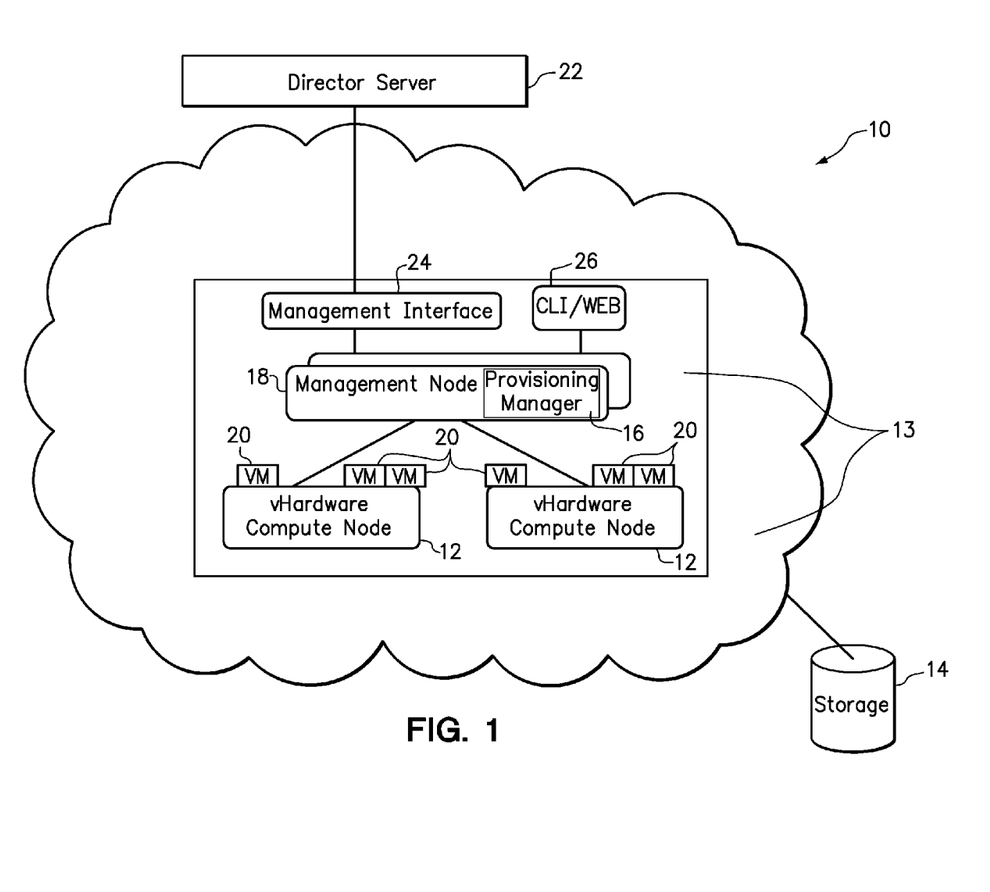
FIG. 1 is a schematic diagram of a group of servers or compute nodes in a "cloud" environment as a pool of resources for users.

FIG. 1 is a schematic diagram of a system 10 including a group of servers or other compute nodes 12 in a "cloud" environment as a pool of resources for users. The compute nodes 12 within the cloud are in communication over the network 13 with a boot storage device 14 that provides the guest operating systems and applications for the users. The provisioning manager software 16 resides in the management node 18 and allocates boot storage within the storage device 14 to contain the maximum number of guest operating systems and associate applications based on the total amount of storage within the cloud. For example, if each guest operating system and its associated applications require 1 GByte of storage and the additional memory space needed to execute those applications is 1 GByte, then each virtual machine 20 requires 2 GBytes of memory storage. If the total amount of memory storage within a physical compute node 12 is 64 GB, then the provisioning software 16 assumes that each physical compute node 12 can support 32 virtual machines 20. It is assumed that the processor within the physical compute node 12 is able to execute multiple virtual machines 20 concurrently.

The Director Server 22 within the cloud structure is the entity that manages and allocates the operating system, licenses, and associated applications to all virtual machines 20 within the compute nodes of the cloud structure. The Director Sever 22 obtains the physical attributes of all the compute nodes 12 within the cloud structure and provisions the operating systems and applications within the storage device 14. The management interface 24, which is typically an Ethernet interface, provides the physical interface between the cloud and the Director Server 22. A CLI/WEB 26 allows administrators to monitor the configuration and dynamically change it depending on network conditions. Within the network cloud, network switches connect the vHardware compute nodes 12 to each other and to the management node 18 and the associated provisioning manager 16. The Director Server controls the overall provisioning of operating systems, licenses and associated application by communicating with the management node 18 and provisioning manager 16. In actual practice, the management node 18 and provisioning manager 16 reside in an industry rack full of compute nodes while the Director Server controls multiple racks of management nodes 18, provisioning mangers 16 and computer nodes 12.

BRIEF SUMMARY

Another embodiment of the present invention provides a method, and a computer program product for performing the method, comprising managing a first plurality of virtual machines on a first compute node and a second plurality of virtual machines on a second compute node, wherein the first compute node is coupled to a first Ethernet link of a network switch and the second compute node is coupled to a second Ethernet link of the network switch, and wherein each of the virtual machines is assigned an Internet Protocol address. The method further comprises obtaining data from a management information database of the network switch to determine the amount of network bandwidth being utilized through each of the first and second Ethernet links. In addition, the method comprises provisioning an additional virtual machine to the compute node that is coupled to the Ethernet link identified as having the greatest amount of unutilized network bandwidth.

DETAILED DESCRIPTION

One embodiment of the present invention provides a method, and a computer program product for performing the method, comprising managing a first plurality of virtual machines on a first compute node and a second plurality of virtual machines on a second compute node, wherein the first compute node is coupled to a first Ethernet link of a network switch and the second compute node is coupled to a second Ethernet link of the network switch, and wherein each of the virtual machines in the compute node is assigned an Internet Protocol address. The method further comprises obtaining data from a management information database of the network switch to determine the amount of network bandwidth being utilized through each of the first and second Ethernet links and to determine the amount of network bandwidth being utilized by the Internet Protocol addresses attributable to each of the virtual machines within each compute node. In addition, the method comprises migrating one or more of the virtual machines from the first compute node to the second compute node in response to the first Ethernet link oversubscribing the physical bandwidth limit. As an alternative to migrating in response to over-subscription, the method may comprise migrating one or more of the virtual machines from the first compute node to the second compute node in response to the first Ethernet link utilizing a greater amount of network bandwidth than the second Ethernet link.

The method is preferably executed by a provisioning manager module running on the management node. The provisioning manager is thus responsible for provisioning the virtual machines within the compute node and then managing them. In the context of an Ethernet network, the provisioning manager is in communication with a network switch, or high speed switch module (HSSM), which includes a management information database, or management information base (MIB). Accordingly, the provisioning manager may obtain network statistics from the management information base, such as the amount of network traffic through each Ethernet link and the amount of that network traffic attributable to each Internet Protocol (IP) address or each VM within the compute node. Access to this information enables the provisioning manager to determine whether an Ethernet link to a given compute node has reached its link capacity, such that the compute node's virtual machines, as identified by their IP addresses, may be experiencing increased latency or reduced response time.

Accordingly to the present invention, any number of conditions could be used to determine that a virtual machine should be migrated to a different compute node having a greater amount of unutilized network bandwidth. In one embodiment, one or more of the virtual machines from a first compute node are migrated to a second compute node in response to the first Ethernet link utilizing a greater amount of network bandwidth than the second Ethernet link. In another embodiment, a virtual machine from a first compute node is migrated to a second compute node or compute node if the amount of network bandwidth of the compute node is higher than the theoretical maximum for the physical network connection. Optionally, the method may further comprise determining that the amount of network bandwidth available on the second Ethernet link is greater than or equal to the bandwidth required by the one or more virtual machine to be migrated. This step is preferably performed prior to migrating the one or more of the virtual machines, and the migration may be conditioned upon, or in response to, such a determination. If the second Ethernet link, which is coupled to the target compute node, does not have enough network bandwidth available to meet the full network bandwidth requirements of the virtual machine selected to be migrated, then there may be little, if any, performance benefit to the migration. Still, there might be some marginal performance improvement if the target compute node has more unutilized network bandwidth than the amount of network bandwidth that the virtual machine is able to utilize on the compute node where it currently resides. In a still further embodiment, a virtual machine may be migrated in response to the addition of a new virtual machine that over-subscribes the theoretical maximum network bandwidth of the physical link.

In another embodiment, the step of migrating includes dynamically migrating one or more of the virtual machines among the compute nodes within the network to provide each virtual machine with a predetermined amount of network bandwidth. The same predetermined amount, such as 500 megabits per second (Mbps), may be establish for each virtual machine, or each virtual machine may be assigned a predetermined amount of network bandwidth based upon the application(s) to be run on the virtual machine. Accordingly, if a virtual machine is experiencing poor response time, it may be migrated to a compute node that has enough unutilized network bandwidth to provide the virtual machine with its predetermined amount of network bandwidth. Alternatively, the provisioning manager could search the Director Server's configuration database to find the compute node with the least bandwidth used.

Another embodiment provides a hysteresis function to the foregoing methods so that the provisioning manager does not migrate virtual machines based on minor or temporary variations in the amount of network bandwidth available to a virtual machine. One non-limiting example of such a hysteresis function enforces a time delay after migration of a virtual machine from the first compute node to the second compute node before allowing any subsequent migration of a virtual machine. In networks having more than two compute nodes, a time delay may be enforced after any particular migration. Optionally, a time delay may be enforced selectively to only prevent only a specific migration of a virtual machine. Non-limiting examples of such a selective time delay includes delaying a subsequent migration to the same target compute node, or delaying migration to a compute node from which a virtual machine was just migrated. Still further, a hysteresis function may be implemented by the network switch averaging the network bandwidth statistics and storing the average in the management information base. In this embodiment, peak network bandwidth is averaged over time to ensure that migration among servers does not occur based on a single instance of a server maximizing the usage of available network bandwidth. Otherwise, multiple VM migrations may become uncontrollable.

Although the above methods of the present invention are directed primarily at migrating a virtual machine that is being preventing from receiving a given amount of the network bandwidth resources that it needs, the invention might also be implemented to migrate virtual machines among a plurality of compute nodes in the network in order to improve the balance of bandwidth usage among the Ethernet links. Proactively balancing the usage of network bandwidth among the Ethernet links may not immediately improve the operation of any of the virtual machines, but may prevent a future degradation of network response times should one or more of the virtual machines increase their utilization of network bandwidth.

In yet another embodiment, first and second virtual machines may be swapped between first and second compute nodes so that the network bandwidth requirements of the virtual machines matches better with the network bandwidth available of the Ethernet links associated with the first and second compute nodes. For example, consider a first virtual machine (VM1) requiring 800 Mbps that is running on a first server (51) with an Ethernet link that has reached its capacity and can provide only 600 Mbps of network bandwidth to the first virtual machine. Further consider that the same network includes a second virtual machine (VM2) requiring only 500 Mbps, where the second virtual machine is running on a second server (S2) with an Ethernet link that has not yet reached its capacity and has 400 Mbps of available network bandwidth. In this situation, neither Ethernet link has enough unutilized network bandwidth in order to accommodate the migration of either the first virtual machine to the second server (i.e., the required 800 Mbps of VM1> the available 400 Mbps of S2) or the second virtual machine to the first server (i.e., S2 has already exceeding its capacity) However, the provisioning manager has access to this information and may migrate the first virtual machine to the second server and migrate the second virtual machine to the first server, such that the Ethernet links are able to meet the full network bandwidth requirements of both virtual machines. Specifically, the second server is able to accommodate the 800 Mbps required by the first virtual machine, because the second server had 400 Mbps available and will have an additional 500 Mbps freed up as a result of migrating the second virtual machine to the first server. In addition, the first server is able to accommodate the 500 Mbps of the second virtual machine, because first server is no longer providing 600 Mbps to the first virtual machine.

Another embodiment of the invention provides a method of provisioning an additional virtual machine to one of a plurality of compute nodes on a network based upon the network bandwidth statistics obtained from a management information database. The method comprises managing a first plurality of virtual machines on a first compute node and a second plurality of virtual machines on a second compute node, wherein the first compute node is coupled to a first Ethernet link of a network switch and the second compute node is coupled to a second Ethernet link of the network switch, and wherein each of the virtual machines is assigned an Internet Protocol address. Data is obtained from a management information database of the network switch to determine the amount of network bandwidth being utilized through each of the first and second Ethernet links. Accordingly, an additional virtual machine may be provisioned to the compute node that is coupled to the Ethernet link identified as having the greatest amount of unutilized network bandwidth. Optionally, the method may further comprise determining, prior to provisioning the additional virtual machine, that the amount of unutilized network bandwidth on the identified Ethernet link is greater than or equal to the network bandwidth required by the additional virtual machine. Other aspects of the invention described above with respect to migrating virtual machines may also be applied to methods of provisioning virtual machines Although the foregoing methods have been described in terms of a first compute node and a second compute node, it should be recognized that the methods may also be performed in a network including more than two compute nodes, where each compute node has its own Ethernet link to a network switch. Furthermore, the network may include compute nodes coupled to more than one network switch where the provisioning manager is able to obtain network traffic statistics from each of the network switches. Still further, the method may include multiple provisioning managers or objects that are in communication to cooperatively provision or migrate the virtual machines that they manage.

Figure 2:
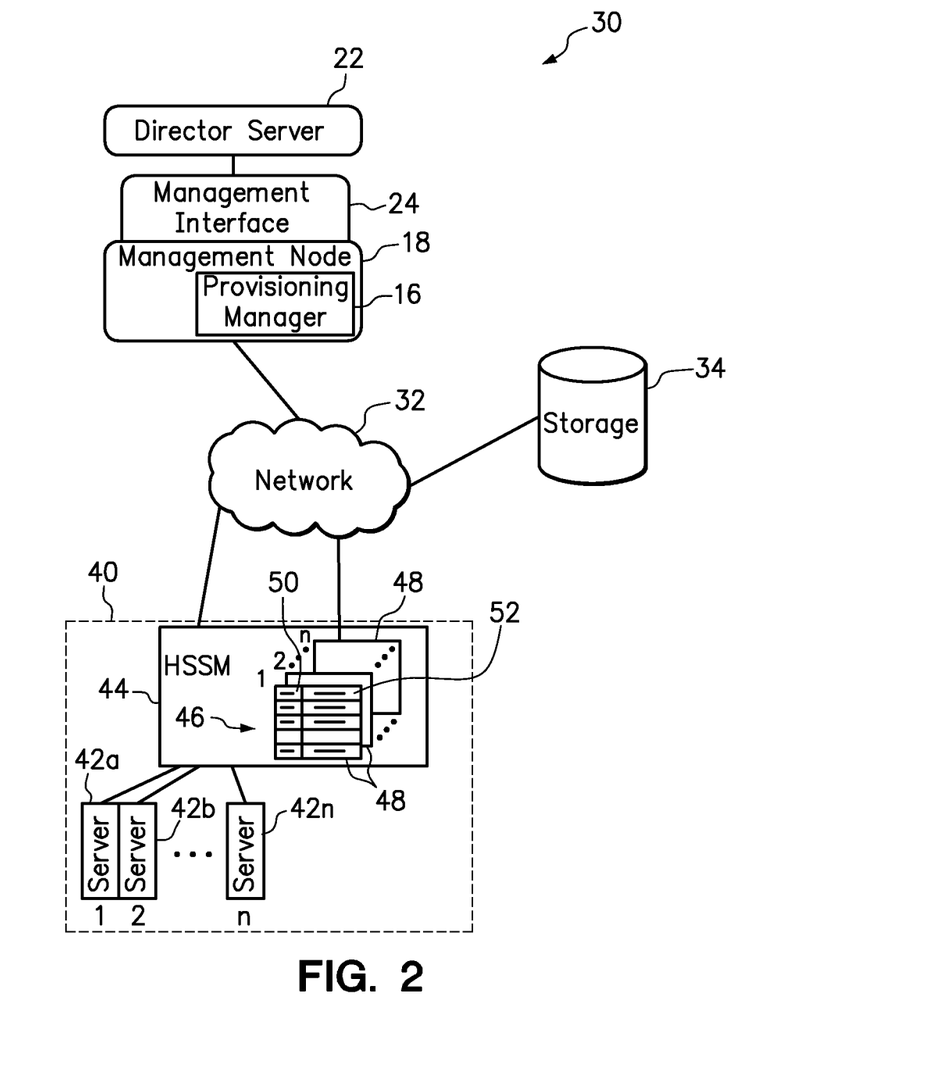
FIG. 2 is a schematic diagram of a plurality of compute nodes coupled to a network switch providing access to a network.

FIG. 2 is a schematic diagram of a system 30 including a plurality of compute nodes, shown as servers 42a-42n, coupled to a network switch 44 providing access to a network 32 and storage 34. The servers 42a-42n and the network switch 44 may be conveniently provided in a blade server system 40, such as the BLADECENTER (a trademark of IBM Corporation, Armonk, N.Y.). Each server blade 42 is connected to the high speed switch module (HSSM) 44 which allows access to a network 32, which might include a Data Center Network, a boot node, or a storage area network (SAN). The HSSM 44 routes traffic to the appropriate destination based on the Internet Protocol (IP) address within the Ethernet frame.

The HSSM 44 includes an IEEE-defined and standardized Management Information Base (MIB) 46 which contains network statistics for each Ethernet link and each IP address. In FIG. 2, an example of the network statistics are illustrated only for one Ethernet link, but the MIB 46 would also include similar network statistics for each Ethernet link. Potentially, "n" servers are coupled to "n" Ethernet ports of the switch 44 and the MIB 46 would keep one table 48 for each of the "n" Ethernet links. The MIB 46 is typically updated at least once each second so the traffic statistics are reliable in the short term. As the traffic traverses the HSSM 44, the HSSM records the IP address (column 50) and network statistics, for example including the network bandwidth of communications attributable to the IP address (column 52). The HSSM 46 can determine how many virtual machines are assigned to a physical server by the number of IP addresses reserved for operating systems running on top of the hypervisor. Although the MIB 46 is illustrated as set of tables, it should be recognized that other data structures may also be employed within the scope of the invention.

As the traffic from one of the server blades to the HSSM increases, an increase in the response time to the virtual machines on that server blade can occur. To ensure adequate response times, the provisioning manager 16 may migrate one or more virtual machines from one physical server to one of the other physical servers within the blade server system 40, or another server in the network 32, where it is determined that the Ethernet link is under-utilized. The provisioning manager 16 resides on the management node 18, which includes a management interface 24 facilitating communications between the director server 22 and the management node 24.

Figure 3A:
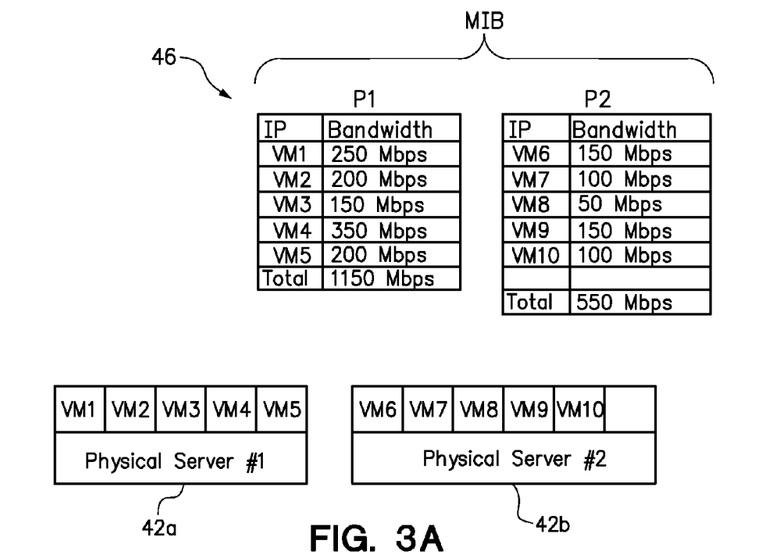
FIGS. 3A and 3B are diagrams illustrating certain contents of a management information database and virtual machines running on two compute nodes.

FIG. 3A is a diagram illustrating certain contents of the management information database 46, a plurality of virtual machines (VM1-VM5) running on a first physical server (P1) 42a, and a plurality of virtual machines (VM6-VM10) running on a second server (P2) 42b. Each of the virtual machines has a unique IP address which, for purposes of illustration only, is simply represented by the virtual machine ID. Although this virtual environment has the reduced complexity of two physical servers, the method described can be expanded to any number of servers.

Physical server #1 with five virtual machines below shows that the link capacity of 1 Gbps (1000 Mbps) for physical server #1 has been reached and exceeded. Specifically, the bandwidth required by VM1-VM5 totals 1150 Mbps. However, Physical server #2 with a similar number of virtual machines has extra bandwidth capacity of 450 Mbps (i.e., 1 Gbps-550 Mbps). The provisioning server when reading the MIB for the Ethernet link to Physical server #1 (P1) knows that the link has reached capacity. Similarly, the provisioning server knows that Physical server #2 has extra link capacity.

Figure 3B:
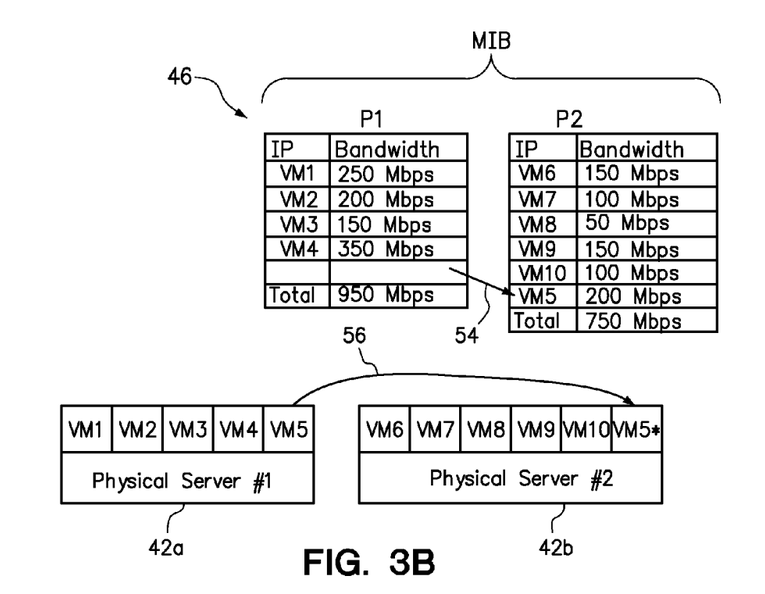

Referring to FIG. 3B, the provisioning server determines that VM5 should be migrated (See arrows 54 and 56) from physical server #1 to physical server #2. This migration allows each virtual machine to fully utilize the bandwidth without over-subscribing the bandwidth capacity of either Ethernet link. The result is a more balance usage of total bandwidth resulting in better response time to all users. In this example, the total network bandwidth utilized by P1 is 950 Mbps and the total network bandwidth utilized by P2 is 750 Mbps. Accordingly, a sufficient amount of network bandwidth is able to be provided to each virtual machine.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible storage medium having computer-usable program code stored on the storage medium.

Any combination of one or more computer usable or computer readable storage medium(s) may be utilized. The computer-usable or computer-readable storage medium may be, for example but not limited to, an electronic, magnetic, electromagnetic, or semiconductor apparatus or device. More specific examples (a non-exhaustive list) of the computer-readable medium include: a portable computer diskette, a hard disk, random access memory (RAM), read-only memory (ROM), an erasable programmable read-only memory (EPROM or Flash memory), a portable compact disc read-only memory (CD-ROM), an optical storage device, or a magnetic storage device. The computer-usable or computer-readable storage medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable storage medium may be any storage medium that can contain or store the program for use by a computer. Computer usable program code contained on the computer-usable storage medium may be communicated by a propagated data signal, either in baseband or as part of a carrier wave. The computer usable program code may be transmitted from one storage medium to another storage medium using any appropriate transmission medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
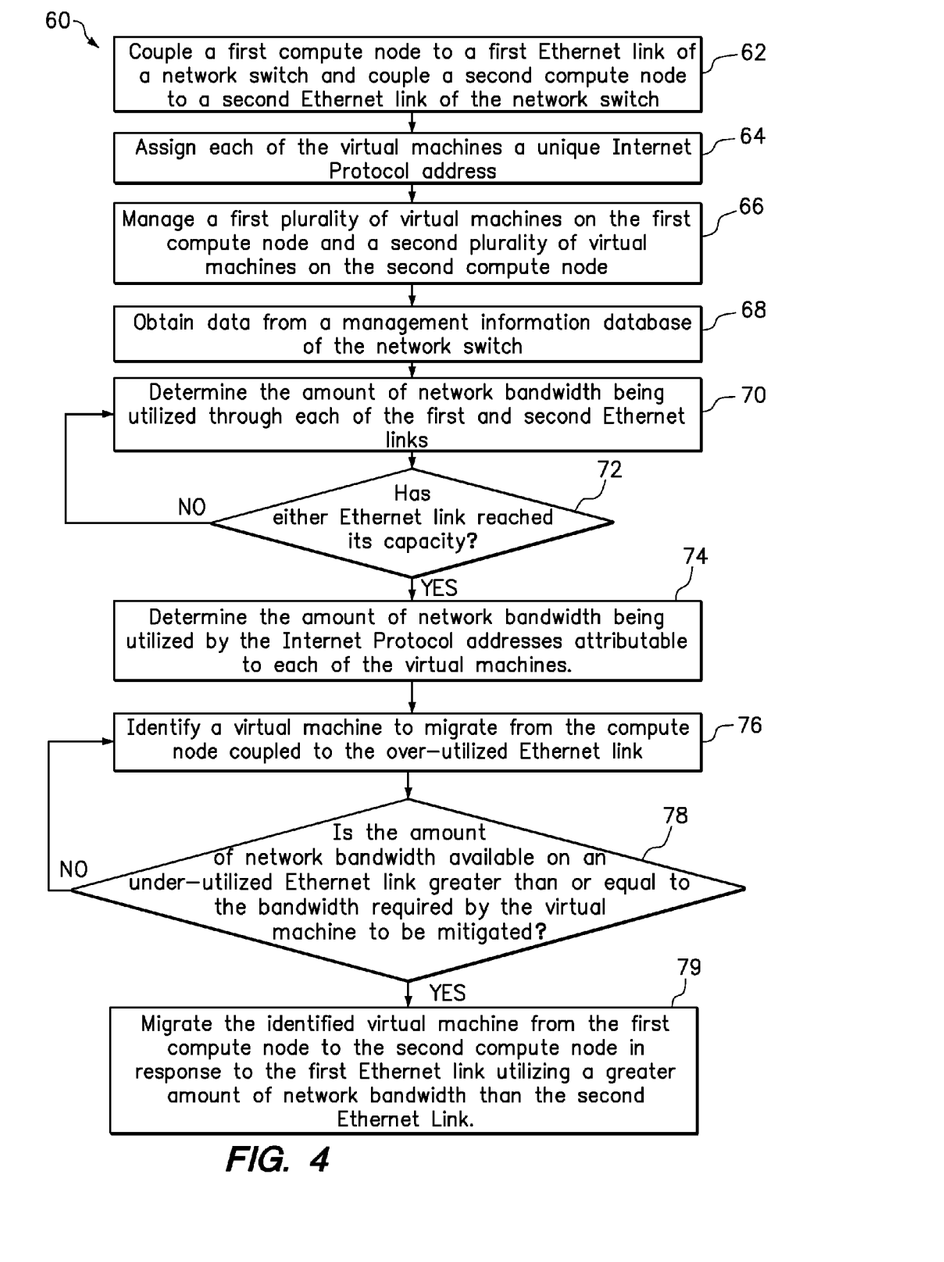
FIG. 4 is a flowchart of a method for migrating a virtual machine from one compute node to another compute node.

FIG. 4 is a flowchart of a method 60 for migrating a virtual machine from one compute node to another compute node. In step 62, a first compute node is coupled to a first Ethernet link of a network switch and a second compute node is coupled to a second Ethernet link of the network switch. Each of the virtual machines is assigned a unique Internet Protocol address in step 64. Accordingly, a first plurality of virtual machines on the first compute node and a second plurality of virtual machines on the second compute node are managed, typically by a provisioning manager or hypervisor, in step 66.

In step 68, data is obtained from a management information database of the network switch. This data is then used, in step 70, to determine the amount of network bandwidth being utilized through each of the first and second Ethernet links. If one of the Ethernet links has reached its capacity in step 72 then, in step 74, the amount of network bandwidth being utilized by the Internet Protocol addresses attributable to each of the virtual machines is determined. Step 76 includes identifying a virtual machine to migrate from the compute node coupled to the over-utilized Ethernet link. If, in step 78, the amount of network bandwidth available on an under-utilized Ethernet link is greater than or equal to the bandwidth required by the virtual machine to be migrated, then, in step 79, the identified virtual machine is migrated from the first compute node to the second compute node in response to the first Ethernet link utilizing a greater amount of network bandwidth than the second Ethernet link.

Figure 5:
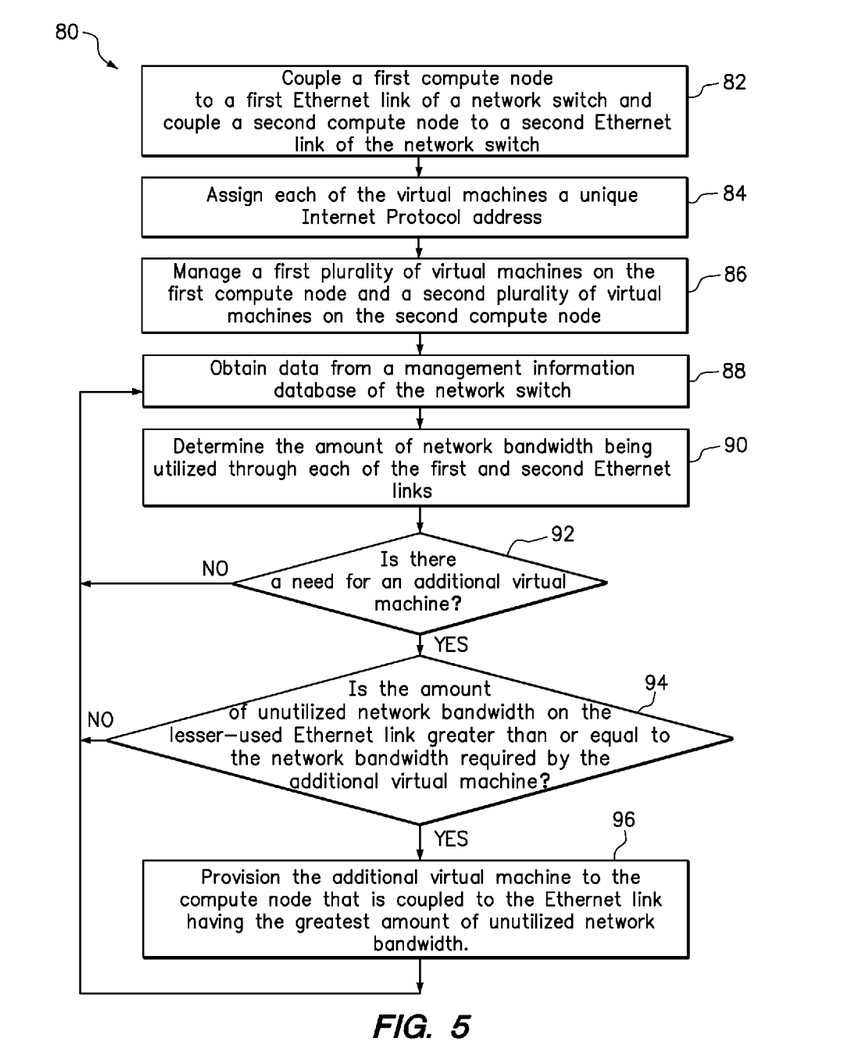
FIG. 5 is a flowchart of a method for provisioning an additional virtual machine onto a compute node.

FIG. 5 is a flowchart of a method 80 for provisioning an additional virtual machine onto a compute node. In step 82, a first compute node to a first Ethernet link of a network switch and couple a second compute node to a second Ethernet link of the network switch. Each of the virtual machines is assigned a unique Internet Protocol address in step 84. Accordingly, a first plurality of virtual machines on the first compute node and a second plurality of virtual machines on the second compute node are managed, typically by a provisioning manager or hypervisor, in step 86.

In step 88, data is obtained from a management information database of the network switch. This data is then used, in step 90, to determine the amount of network bandwidth being utilized through each of the first and second Ethernet links. If there is a need for an additional virtual machine in step 92, for example because a user has requested to run an application on the network cloud, then, in step 94, it is determined whether the amount of unutilized network bandwidth on the lesserused Ethernet link is greater than or equal to the network bandwidth required by the additional virtual machine. If step 94 is answered in the affirmative, then the additional virtual machine is provisioned to the compute node that is coupled to the Ethernet link having the greatest amount of unutilized network bandwidth in step 96.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    managing a first plurality of virtual machines on a first compute node and a second plurality of virtual machines on a second compute node, wherein the first compute node is coupled to a first Ethernet link of a network switch and the second compute node is coupled to a second Ethernet link of the network switch, and wherein each of the virtual machines is assigned an Internet Protocol address;
    obtaining data from a management information database of the network switch;
    determining an amount of network bandwidth being utilized through each of the first and second Ethernet links using the data obtained from the management information database of the network switch; and
    provisioning an additional virtual machine to the compute node that is coupled to the Ethernet link identified as having the greatest amount of unutilized network bandwidth.

2. The method of claim 1, further comprising:
    prior to provisioning the additional virtual machine, determining that the amount of unutilized network bandwidth on the identified Ethernet link is greater than or equal to the network bandwidth required by the additional virtual machine.

3. The method of claim 2, wherein the step of provisioning includes dynamically provisioning the virtual machines among the compute nodes within the network to provide each virtual machine with a predetermined amount of network bandwidth; and providing each virtual machine with the predetermined amount of network bandwidth.

4. The method of claim 1, wherein each virtual machine runs a separate instance of an operating system identified by a unique IP address.

5. The method of claim 1, further comprising:
    provisioning virtual machines among a plurality of compute nodes in the network in order to improve the balance of bandwidth usage among the Ethernet links.

6. A computer program product including computer-usable program code embodied on a computer-usable storage medium, the computer program product including:
    computer-usable program code for managing a first plurality of virtual machines on a first compute node and a second plurality of virtual machines on a second compute node, wherein the first compute node is coupled to a first Ethernet link of a network switch and the second compute node is coupled to a second Ethernet link of the network switch, and wherein each of the virtual machines is assigned an Internet Protocol address;
    computer-usable program code for obtaining data from a management information database of the network switch;
    computer-usable program code for determining an amount of network bandwidth being utilized through each of the first and second Ethernet links using the data obtained from the management information database of the network switch; and
    computer-usable program code for provisioning an additional virtual machine to the compute node that is coupled to the Ethernet link identified as having the greatest amount of unutilized network bandwidth.

7. The computer program product of claim 6, further comprising:
    computer-usable program code for determining that the amount of unutilized network bandwidth on the identified Ethernet link is greater than or equal to the network bandwidth required by the additional virtual machine prior to provisioning the additional virtual machine.

8. The computer program product of claim 6, wherein the computer-usable program code for provisioning includes computer-usable program code for dynamically provisioning the virtual machines among the compute nodes within the network to provide each virtual machine with a predetermined amount of network bandwidth, and computer-usable program code for providing each virtual machine with the predetermined amount of network bandwidth.

9. The computer program product of claim 6, wherein each virtual machine runs a separate instance of an operating system identified by a unique IP address.

10. The computer program product of claim 6, further comprising:
    computer-usable program code for provisioning virtual machines among a plurality of compute nodes in the network in order to improve the balance of bandwidth usage among the Ethernet links.

* * * * *